United States Patent [19] [11] Patent Number: 4,834,487
Abendschein et al. [45] Date of Patent: May 30, 1989

[54] OPTICAL CONNECTOR WITH PLASTIC ALIGNMENT FERRULE

[75] Inventors: Frederic H. Abendschein, Columbia; John H. Huber, Harrisburg, both of Pa.

[73] Assignee: AMP Incorporated, Harrisburg, Pa.

[21] Appl. No.: 251,612

[22] Filed: Sep. 29, 1988

[51] Int. Cl.⁴ ............................................... G02B 6/36
[52] U.S. Cl. ................................ 350/96.20; 350/96.21
[58] Field of Search ................ 350/96.20, 96.21, 96.22

[56] References Cited

U.S. PATENT DOCUMENTS

| | | | |
|---|---|---|---|
| 3,950,483 | 4/1976 | Spier | 264/328 |
| 4,107,242 | 8/1978 | Runge | 264/1 |
| 4,264,128 | 4/1981 | Young | 350/96.20 |
| 4,424,174 | 1/1984 | Howarth | 264/1.5 |
| 4,512,630 | 4/1985 | Runge | 350/96.21 |
| 4,634,214 | 1/1987 | Cannon, Jr. et al. | 350/96.20 |
| 4,648,688 | 3/1987 | Ashman et al. | 350/96.20 |
| 4,649,616 | 3/1987 | Bricker | 29/406 |
| 4,666,241 | 5/1987 | Caron | 350/96.21 |
| 4,691,986 | 9/1987 | Aberson, Jr. et al. | 350/96.21 |
| 4,711,518 | 12/1987 | Shank et al. | 350/96.20 |
| 4,722,584 | 2/1988 | Kakii et al. | 350/96.20 |

Primary Examiner—William L. Sikes
Assistant Examiner—Akm E. Ullah
Attorney, Agent, or Firm—Gerald K. Kita

[57] ABSTRACT

An optical connector 1 comprising, an alignment ferrule 11 having a central passage 14 for aligning an optical fiber 3 of an optical fiber cable 2, a rear end 19 of the ferrule 11 for connection to an optical fiber cable 2, a radially enlarged collar 20 surrounding the ferrule 11, a circumferential groove 23 in the ferrule 11, a coupling nut 26 moveable axially over the ferrule 11, a clearance 29 between the coupling nut 26 and the collar 20 in which the collar 20 is retracted to compress the spring 28, the ferrule 11 is unitary with the transverse front face 22 and the rear face 24 of the collar 20, the ferrule 11 and the collar 20 are molded from a rigid plastic material, and the collar 20 includes mold gate flash 48 on the molded plastic material only at locations along the clearance 29 between the collar 20 and the coupling nut 26.

5 Claims, 4 Drawing Sheets

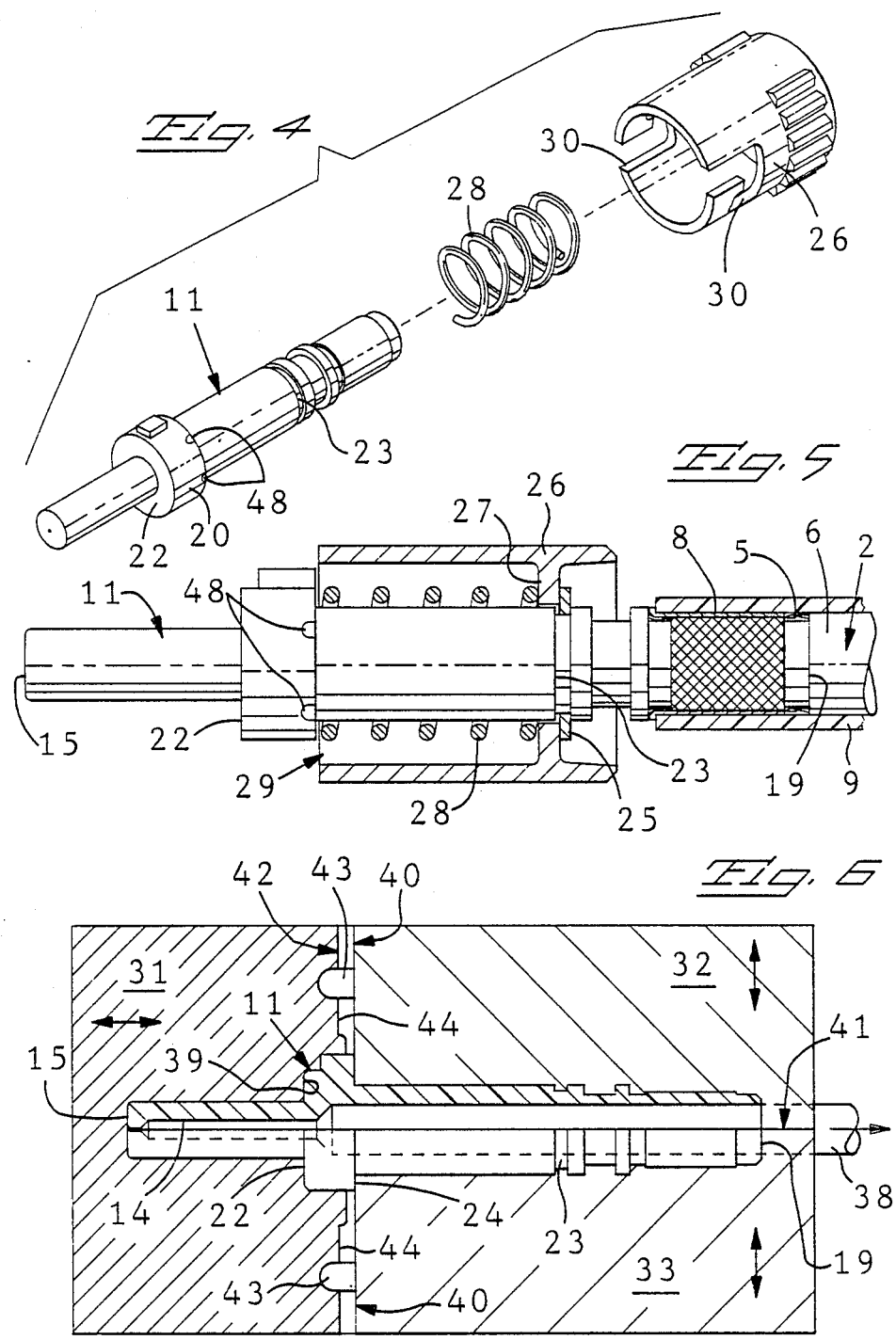

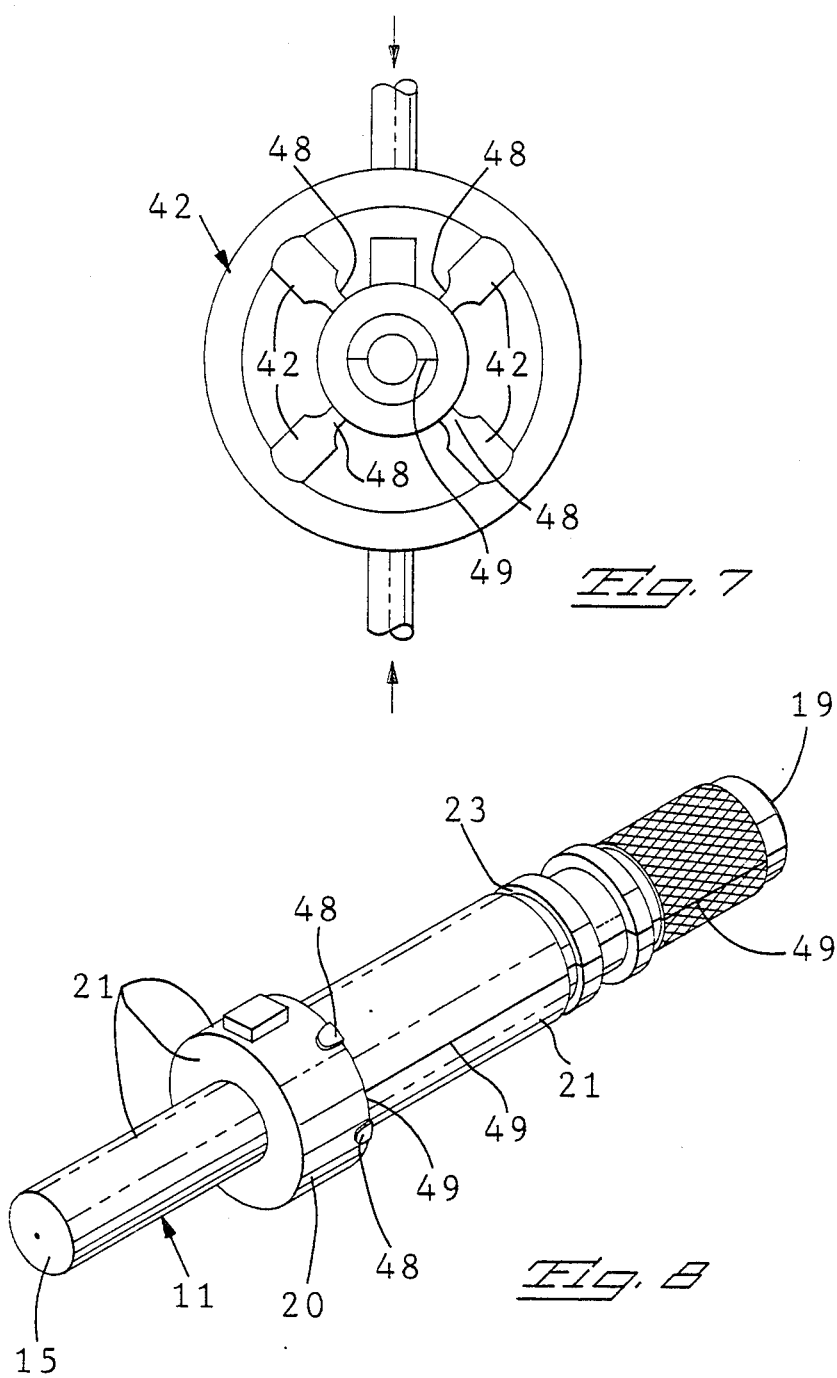

OPTICAL CONNECTOR WITH PLASTIC ALIGNMENT FERRULE

FIELD OF THE INVENTION

The specification relates to a connector having a relatively rigid and hard alignment ferrule for holding an optical fiber, and particularly, a connector having a plastic ferrule that is interchangeable with a ferrule having metal and ceramic parts.

BACKGROUND OF THE INVENTION

A known optical connector is disclosed in U.S. Pat. No. 4,167,303 wherein an alignment ferrule of resilient material includes a unitary enlarged collar The resilient ferrule encircles an optical fiber, and is inserted along an alignment sleeve. Radial inward compression of the sleeve on the ferrule radially deforms the resilient ferrule to move the optical fiber to a desired alignment axis within the sleeve. A connector with a resilient ferrule differs from a connector to the field of the invention. A connector according to the field of the invention incorporates a rigid and hard alignment ferrule that relies upon precise dimensions of its external surfaces to align the ferrule within an alignment sleeve.

A known connector according to the field of the invention is disclosed in U.S. Pat. No. 4,634,214 manufactured from metal parts except for a ceramic alignment ferrule that aligns an optical fiber along a straight axial passage of the ferrule. An enlarged collar must be provided on the alignment ferrule. The collar is advantageous. The collar enables assembly of the alignment ferrule with other component parts of the connector. The collar is engaged by a biasing spring to urge the alignment ferrule axially forward into an alignment sleeve.

The alignment ferrule is cylindrical with a straight axial passage. The simple geometry of the ferrule is ideally suited for ceramic material Ceramic material can be molded in simple shapes with small dimensional tolerances. The alignment ferrule of the known connector is manufactured with a metal collar encircling the ceramic alignment ferrule. The collar is secured in place by a frictional force fit or by an adhesive.

A metal collar is readily machined to achieve accurate dimensions and a small size. It has been impracticable to manufacture a ceramic alignment ferrule with an enlarged unitary collar. The collar would add unevenly distributed mass to the alignment ferrule. A small piece part with unevenly distributed mass is difficult to mold in ceramic material, resulting in unacceptable numbers of ill formed piece parts. In addition, ceramic material is extremely hard and resistant to machining.

SUMMARY OF THE INVENTION

The invention is directed to a molded unitary alignment ferrule and a unitary enlarged radial collar for an optical connector. An important aspect of the invention is that surface imperfections in the form of mold flash are located away from the front end of the ferrule and the front face 22 of the collar.

A molded plastic piece part will have surface imperfections, called flash. Flash is formed on a molded piece part wherever a passage, called a gate, intersects the molded piece part. Flash also is formed in a crevice of a parting line along which the mold dies are opened to permit removal of the molded piece part. A molded piece part to be used as a unitary alignment ferrule would have flash. The flash would interfere with insertion of the alignment ferrule along the alignment sleeve. Prior to the invention, there has been no molded plastic piece part that would have mold flash be located away from a front end and a collar of a unitary alignment ferrule.

Other advantages and aspects of the invention are apparent by way of example from a detailed description that follows and from accompanying drawings.

DESCRIPTION OF THE DRAWINGS

FIG. 4 is a perspective view with parts exploded of component parts of the connector shown in FIG. 1.

FIG. 5 is a longitudinal section views of the connector shown in FIG. 1.

FIG. 6 is a longitudinal section through mold dies and through a unitary alignment ferrule of the connector shown in FIG. 1.

FIG. 7 is an end view of the configuration attained by plastic material filling a runner and gate system of the mold dies shown in FIG. 6.

FIG. 8 is a unitary alignment ferrule illustrating mold flash.

With reference to FIG. 1, there is depicted, by way of example, a connector 1 for an optical fiber cable 2. The cable 2 includes an elongated central optical fiber 3 concentrically encircled by a buffer 4 together comprising a buffer covered fiber 3, 4. The cable 2 includes a load bearing portion in the form of elongated strength members 5 that extend axially along the cable 2. The strength members 5 are distributed over the outer diameter of the buffer covered fiber 3, 4. The cable 2 further includes an outer jacket 6 of polymeric material enclosing the strength members 5 Parts of the cable 2 are cut away as shown to provide a length of fiber 3 projecting from the buffer 4, and a length of the buffer covered fiber 3, 4 projecting from the strength members 5, and lengths of the strength members 5 projecting from the jacket 6.

Figure 1:
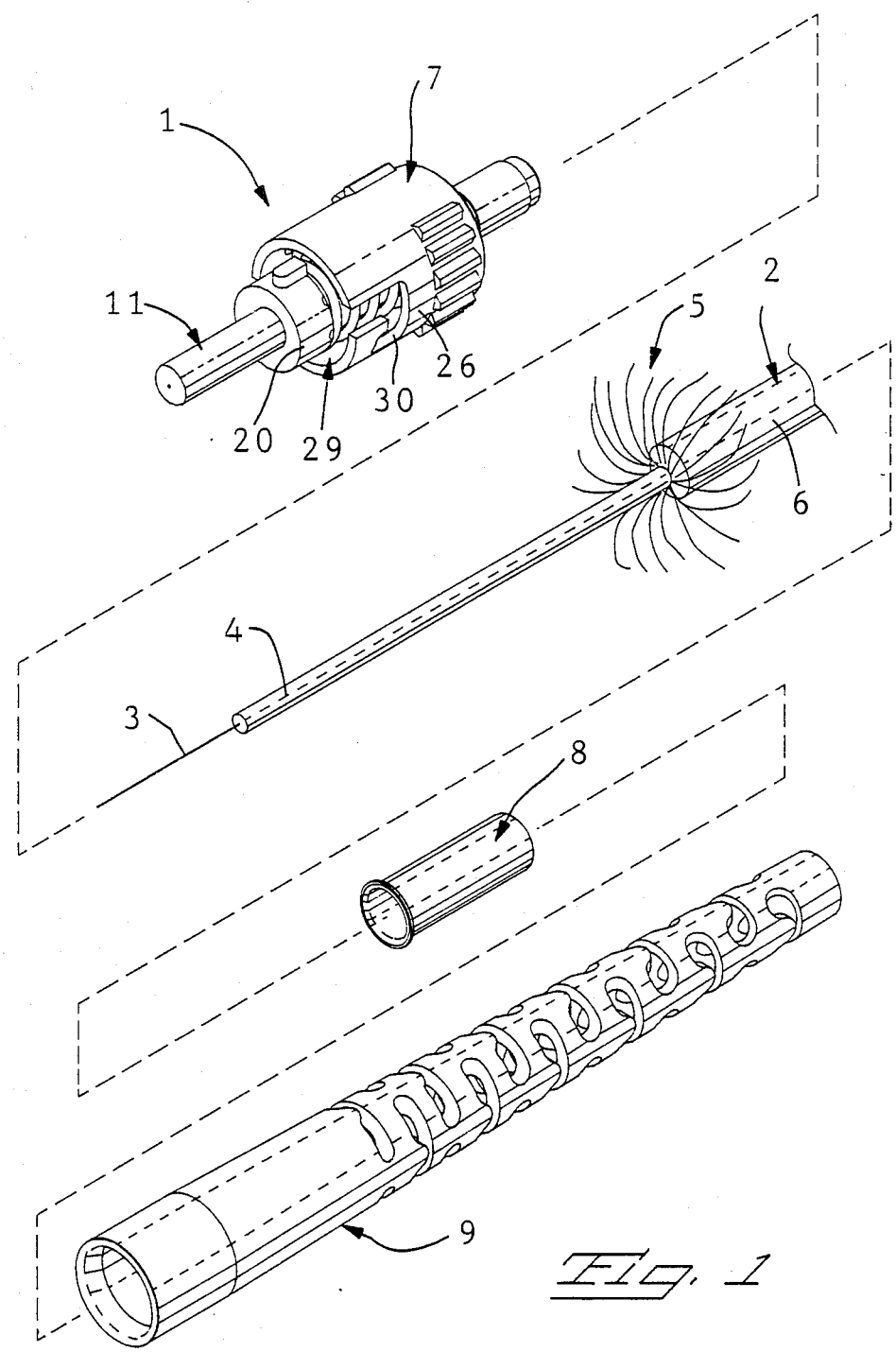
FIG. 1 is a fragmentary perspective view of a connector together with an optical fiber cable, a crimp sleeve and a strain relief depicted in exploded configuration.

The connector 1 includes an optical connector assembly 7 and a crimp ferrule 8. A tubular strain relief boot 9 also is shown. A variation of the connector 1 is shown as a connector 10 in FIG. 2. The connector 10 includes a rigid alignment ferrule 11 in the form of a ceramic portion 12 and a metal portion 13. The ceramic portion 12 has an axial central passage 14 in a front end for aligning the optical fiber 3 of the cable 2. A rear 16 of the ceramic portion 12 is mounted in a socket 17 of the metal portion 13. The metal portion 13 has an axial passage 18 aligned with the passage 14, and emerging from a rear end 19 of the alignment ferrule 11 for connection to the optical fiber cable 2. The alignment ferrule 11 includes, a radially enlarged collar 20 on the metal portion 13 and surrounding the ferrule 11, a cylindrical surface 21 of the ferrule 13 intersecting a transverse front face 22 of the collar 20, and a circumferential groove 23 spaced from a transverse rear face 24 of the collar 20. The connector assembly 7 further includes, a snap ring 25 mounted in the groove 23, a coupling nut 26 moveable axially over the alignment ferrule 11 and having a transverse radially projecting, inner flange 27 encircling the alignment ferrule 11 forwardly of the snap ring 25, a coil spring 28 for compression directly in engagement against the rear face 24 of the collar 20 and for urging a force of compression against the inner flange 27, and a clearance 29 between the coupling nut 26 and the collar 20.

The coupling nut 26 has bayonet type slots 30 for connection with a known complementary connector, not shown. The front end 15 of the ceramic portion 12 is rigid and is constructed to enter an alignment sleeve, not shown, and abut a similar alignment ferrule, not shown, within the sleeve of the complementary connector. In response to abutment of the front end 15 with the alignment ferrule of the complementary connector, the collar 20 is moveable within the coupling nut 26 to compress the spring 28 and produce a spring bias to urge the front end 15 in desired abutment. The collar 20 is moveable in and along the clearance 29 during retraction of the collar 20 into the coupling nut 26 to compress the spring 28.

The alignment ferrule 11 must fulfill important requirements, described as follows. The length of the alignment ferrule 11 from the front end 15 to the front face 22 of the collar 20 must remain free of surface imperfections that would interfere with insertion of the ferrule along the alignment sleeve. The length dimension from the front end 15 of the alignment ferrule 11 to the front face 22 of the collar 20 must be a controlled dimension, that is, a dimension that does not vary from one alignment ferrule 11 to another. This controlled dimension will assure that a depth of insertion of the ferrule within the alignment sleeve will remain within desired dimensional tolerances, thereby to maintain a desired optical connection of the alignment ferrule 11 with the similar alignment ferrule of the complementary connector. The front face 22 of the collar 20 must be devoid of surface imperfections that would project outwardly forward and interfere with a depth of insertion of the ferrule within the alignment sleeve.

The above requirements have been fulfilled by the alignment ferrule 11 wherein the collar 20 is manufactured by screw machine, to assure a front face 22 free of surface imperfections, and the front end 15 of the alignment ferrule 11 is manufactured of molded ceramic material to obtain dimensional accuracy. The alignment ferrule 11 is costly, because of the cost of screw machine manufacture, the cost of a ceramic piece part and the cost of assembly of the alignment ferrule 11 with the collar 20.

With reference to FIGS. 4–8 a unitary alignment ferrule 11 that fulfills the above requirements is manufactured by conventional molding apparatus. The alignment ferrule 11 includes a front end 15, a radially enlarged collar 20 with a transverse front face 22 and a projecting alignment key and a transverse rear face 24, and a remainder of the alignment ferrule 15 provided with a circumferential groove 23 for receiving a snap ring 25 that projects radially outward from the remainder of the alignment ferrule 11. The unitary alignment ferrule 1 includes a continuous, stepped cylindrical surface 21 that extends from the front end 15, intersects the front face 22 of the collar 20, extends to the rear face 24 of the collar 20 and to the rear end 19. A stepped diameter central passage 14 extends through the alignment ferrule Prior to the invention, there has been no molded plastic piece part that would fulfill the requirements, described above, for a rigid alignment ferrule 11. Any molded plastic piece part will have surface imperfections, called flash. Flash is formed on a molded piece part wherever a passage, called a gate, intersects the molded piece part. Flash also is formed in a crevice of a parting line along which the mold dies are opened to permit removal of the molded piece part. A molded piece part to be used as a unitary alignment ferrule 11 would have flash. The flash would interfere with insertion of the alignment ferrule 11 along the alignment sleeve.

With reference to FIG. 6, a first mold die 31, a second mold die 32 and a third mold die 33 are manufactured particularly to produce the unitary alignment ferrule 11. A common cavity 34 extends in each of the mold dies, and includes a first cavity portion 35, a second cavity portion 36 and a third cavity portion 37. The first cavity portion 35 in the first mold die 31 is shaped for molding the front end 15 of the alignment ferrule 11 and the collar 20. The second cavity portion 36 in the second mold die 32 is shaped for molding one-half of the remainder of the alignment ferrule 11 extending from the rear face 24 of the collar 20 to the rear end 19. The third cavity portion 37 in the third mold die 33 is shaped for molding the remaining one-half of the remainder of the alignment ferrule 11. A core pin 38 extends along the cavity 34 and along each of the mold dies to form the central passage 14 of the unitary ferrule.

When the mold dies are against one another, as disclosed with reference to FIG. 6, The front end 15 and the collar 20 of the alignment ferrule 11 are formed by a continuous, uninterrupted, surface 39 of the first cavity portion 35. The surface 39 extends to a corresponding transverse parting line 40 coinciding with a transverse rear face 24 of the collar 20 to be formed by the first mold die 31. The second mold die 32 and the third mold die 33 close on the cavity 34 by movement toward and into abutment each other along a corresponding axial parting line 41 extending axially along the remainder of the alignment ferrule 11 from the rear face 24 of the collar 20 to the rear end 19 and across the rear end 19. The second mold die 32 and third mold die 33 move along the transverse parting line 40. The first mold die 31 can be moved toward the transverse parting line 40 toward the closed together mold dies 32, 33.

Plastic material 42 in a fluent state is injected along an annular mold runner 43, namely, a passage encircling the first cavity portion 35 and communicating with the transverse parting line 40. Mold gates 44 communicate with the runner 43 and with the first cavity portion 35 for introducing fluent plastic material 42 into the cavity 34. Fluent plastic material 42 fills the cavity 34 and is solidified in the cavity 34 to form the unitary alignment ferrule 11 while the core pin 38 forms the central passage 14.

The second mold die 32 and the third mold die 33 separate from each other in the direction of the arrows along a corresponding axial parting line 41 to permit removal of the molded alignment ferrule 11. The core pin 38 is withdrawn in the direction of the arrow from the first mold die 31. The second and third mold dies 32, 33 move along the transverse parting line 40 to permit ejection of the alignment ferrule 11 from the first mold die 31. The first mold die 31 can be moved away from the transverse parting line 40 before the mold dies 32, 33 open and separate from each other.

As shown in FIG. 7, plastic material 42 in each of the gates 44 becomes solidified and joined to the unitary alignment ferrule 11, and must be severed from the ferrule 11 and removed from the mold dies 31, 32, 33. Severing takes place when the mold dies 31, 32, 33 have been moved apart from one another and the alignment ferrule 11 is ejected by conventional knock out pins. For example, the first mold die 31 is displaced away from the second and third mold dies 32, 33. Then the second and third mold dies 32, 33 separate from each other, and strike plastic material 42 which has solidified in the gates 44. The plastic material 42 severs from the alignment ferrule 11 when struck by the dies 32,33. Conventional knock out pins push against the alignment ferrule 11 to eject the same from the mold dies 32, 33.

Figure 2:
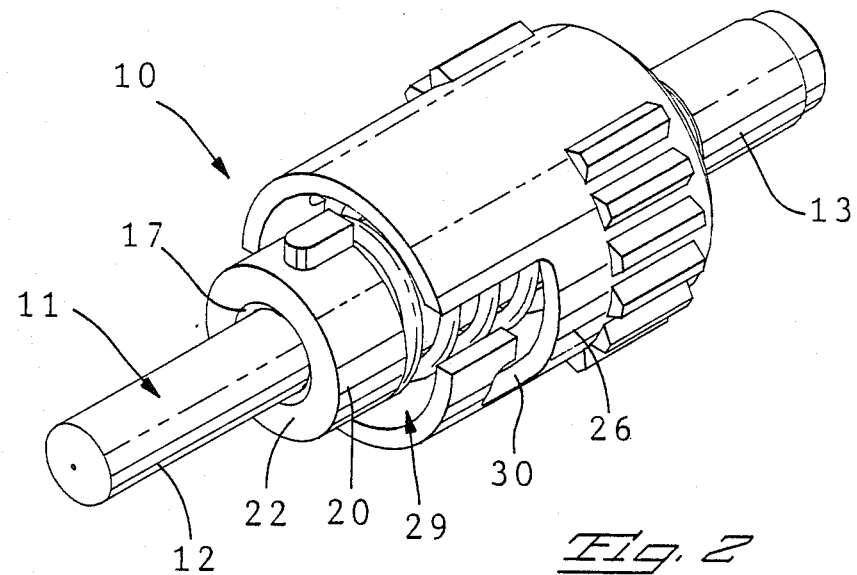
FIG. 2 is a perspective view of a connector including a ceramic alignment ferrule.
Figure 3:
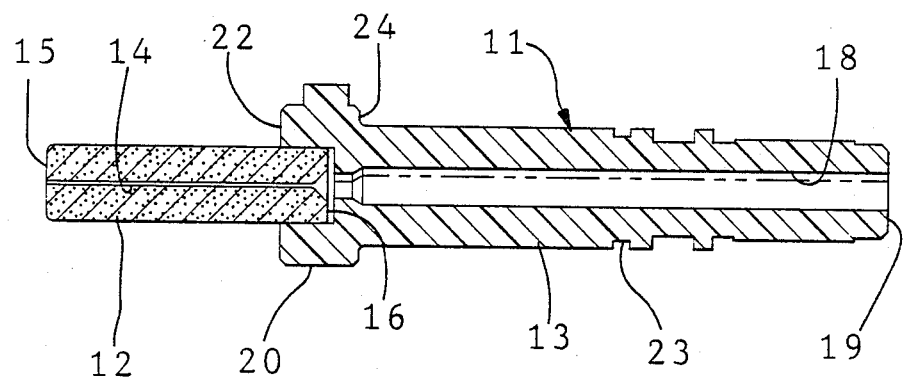
FIG. 3 is a longitudinal section of a portion of the connector shown in FIG. 2.

With reference to FIG. 8 when the plastic material 42 is removed from the alignment ferrule 11, mold gate flash 48 will remain wherever a gate 44 has intersected the molded collar 20. Parting line flash 49 will remain projecting along the outer cylindrical rear edge of the collar 20 along the transverse parting line 40. Additional parting line flash 49 will remain projecting from the remainder of the alignment ferrule 11, and extends from adjacent the rear face 24 of the collar 20 and longitudinally along the alignment ferrule and across the rear end 19. An important aspect of the invention is that the mold flash 48, 49 is located away from the front end 15 of the ferrule and the front face 22 of the collar 20. Mold flash, comprising, for example, the mold gate flash 48 and the mold parting line flash 49, on the collar 20 is adjacent to and intersects the rear face 24, and is spaced axially along the collar 20 away from the front face 22. When the unitary ferrule is assembled with the snap ring 25 and the coupling nut 26, as shown in FIG. 5, the flash 48, 49 on the collar 20 will be located only in the clearance 29 between the collar 20 and the coupling nut 26. The front end 15 of the alignment ferrule 11 and the front face 22 of the collar 20 are devoid of imperfections in the form of a mold parting line mark. The mold flash 49 along the remainder of the alignment ferrule 11 will be located where generous tolerances do not interfere with assembly of the coupling nut 26, the snap ring 25 and the crimp ferrule 8. As depicted in FIG. 1, the unitary alignment ferrule 11 is continuous with the front face 22 and with the rear face 24 of the collar 20. In contrast, the ceramic alignment ferrule 11 depicted in FIG. 2 is separated from the front face 22 of the collar 20 by a periphery of the socket 17.

We claim:

1. In an optical connector comprising, a cylindrical and rigid alignment ferrule having a central passage in a front end for aligning an optical fiber of an optical fiber cable, a rear of the alignment ferrule for connection to an optical fiber cable, a radially enlarged collar surrounding the ferrule, a cylindrical surface of the ferrule intersecting a front transverse face of the collar, a circumferential groove spaced from a rear transverse face of the collar, a snap ring mounted in the groove, a coupling nut moveable axially over the alignment ferrule and having a transverse inner flange encircling the alignment ferrule forwardly of the snap ring, a spring for compression directly in engagement against the rear transverse face of the collar and for compression against the inner flange, a clearance between the coupling nut and the collar in which the collar is moveable during retraction of the collar into the coupling nut to compress the spring, wherein the improvement comprises;
   the alignment ferrule is unitary with the transverse front face and the transverse rear face of the collar,
   the alignment ferrule and the collar are molded from a rigid plastic material,
   and the collar includes imperfections in the form of mold gate flash on the molded plastic material only at locations along the clearance between the collar and the coupling nut.

2. In an optical connector as recited in claim 1, wherein the improvement further comprises; the imperfections are spaced axially rearward of the transverse front face of the collar to avoid engagement of the imperfections with an alignment sleeve in which the front end of the ferrule is inserted.

3. In an optical connector as recited in claim 1, wherein the improvement further comprises; an imperfection in the form of a mold parting line flash extending across the rear of the alignment ferrule and axially along the alignment ferrule and against the transverse rear face of the collar.

4. In an optical connector as recited in claim 1, wherein the improvement further comprises; the front end of the alignment ferrule and the front face of the collar and the cylindrical surface of the collar are molded in a common cavity of a first molding die, and the remainder of the alignment ferrule extending rearward of the rear face of the collar is molded in a composite mold cavity in corresponding second and third molding dies that close along a first mold parting line extending along the first molding die at the rear face of the collar, and that close toward each other along a mold parting line extending across the rear of the alignment ferrule and axially along the alignment ferrule and against the rear face of the collar.

5. In an optical connector as recited in claim 1, wherein the improvement further comprises, the front end of the alignment ferrule and the front face of the collar are devoid of imperfections in the form of a mold parting line flash.

* * * * *